United States Patent [19]

Lipkin

[11] Patent Number: 5,592,377
[45] Date of Patent: Jan. 7, 1997

[54] CHECK CASHING SYSTEM

[76] Inventor: Edward B. Lipkin, 230 S. Broad St., Philadelphia, Pa. 19102

[21] Appl. No.: 401,748

[22] Filed: Mar. 9, 1995

Related U.S. Application Data

[63] Continuation of Ser. No. 174,515, Dec. 18, 1993, abandoned.

[51] Int. Cl.[6] .................................................. G06F 19/00
[52] U.S. Cl. ................................. 395/242; 395/245
[58] Field of Search ......................... 364/406, 408, 364/401 R; 235/379, 381, 380; 340/825.35, 825.34

[56] References Cited

U.S. PATENT DOCUMENTS

| | | | |
|---|---|---|---|
| 3,705,384 | 12/1972 | Wahlberg | 340/825.35 |
| 3,798,603 | 3/1974 | Wahlberg | 340/825.34 |
| 3,876,864 | 4/1975 | Clark et al. | 235/379 |
| 3,896,266 | 7/1975 | Waterbury | 235/380 |
| 3,943,335 | 3/1976 | Kinker et al. | 235/379 |
| 4,317,957 | 3/1982 | Sendrow | 235/379 |
| 4,321,672 | 3/1982 | Braun et al. | 364/408 |
| 4,993,068 | 2/1991 | Piosenka et al. | 340/825.34 |
| 5,220,501 | 6/1993 | Lawlor et al. | 364/408 |
| 5,265,008 | 11/1993 | Benton et al. | 235/379 |

*Primary Examiner*—Donald E. McElheny, Jr.
*Attorney, Agent, or Firm*—Caesar, Rivise, Bernstein, Cohen & Pokotilow, Ltd.

[57] ABSTRACT

An automated check cashing system comprising a customer station, an operator station, and means for enabling two-way communication between them. The customer station includes a cash dispenser. Means are provided for enabling the operator to verify the identity of the customer and the check that is being submitted for cashing. If the operator does not cash the check, it is returned to the customer. If the check is cashed, it is stored in a vault until it can be retrieved.

10 Claims, 3 Drawing Sheets

CHECK CASHING SYSTEM

This application is a Continuation of my copending U.S. patent application Ser. No. 08/174,515, filed on Dec. 18, 1993, now abandoned, entitled Check Cashing System and whose disclosure is incorporated by reference herein.

This invention relates to a check cashing system and more particularly to an automated check cashing system in which there is both visual and voice communication between the person seeking to cash the check and an operator at a remote location.

BACKGROUND OF THE INVENTION

Check cashing agencies are well known as places where a person can convert a check to cash even though the person does not have money on deposit at the agency where the check is presented. If the check is cashed, the customer receives monies provided by the check cashing agency. The check cashing agency then submits the cashed checks for collection in a routine manner to the various banks on which they are drawn.

The decision to cash a check for a particular customer is based on the sound business judgment of the person operating the agency since there is virtually no prospect of recovery if a check is not paid when the agency submits it for collection.

"Check cashing" systems that are based on automatic operator machines that are associated with banks or other depository institutions are well known. However, these systems are actually "cash withdrawal" systems since checks are only cashed for persons who have funds on deposit at that institution. Thus, when the check is cashed, the amount of the check plus any service fee is deducted from the depositor's account.

Suitable identification is required before a check will be cashed at an automatic operator machine. Typically, check cashing will only be accomplished when the automatic operator machine recognizes the check and the customer has identification of a type which has been issued by the depository institution. Usually the identification is a card containing encoded information and a secret code entered by the customer.

The automatic operator machine system has served the community at large quite well. However, there are a substantial number of people who receive checks but who are not affiliated with a bank or other depository institution in which they can make deposits for the purpose of subsequent withdrawal.

To a large extent, these customers must rely upon traditional manually staffed check cashing agencies or check cashing services to convert their checks to usable currency.

Generally speaking, check cashing agencies are relatively scarce in most communities in which they could be advantageously located. Therefore, people who live in such communities are reluctant to accept payment by check. When they do receive a check such as a social security check, they must travel outside the community to cash it.

OBJECTS OF THE INVENTION

It would be advantageous if an automated check cashing system could be established which could function in the same capacity as a manually staffed check cashing agency.

Preferably, such a system would include both visual and voice contact between a remote operator and a customer who desires to cash a check. A decision as to whether the check should be cashed can be made by the operator based on suitable identification, recognition of the customer, recognition of the check and/or the operator's intuition. Thus, a remote system would be created which exactly duplicates and enables the check cashing decision to be made based on the identical factors that are in place when a operator makes a decision to cash a check at manually staffed check cashing agency.

An automated check cashing system represents a substantial departure from traditional manually staffed check cashing systems. Such a system would offer a tremendous advantage to those people who do not have banking relations because they will now be able to cash checks without the inconvenience of traveling to a check cashing agency.

Further, the automated check cashing stations could be located in or near other convenient locations such as shopping malls, supermarkets, transportation hubs, banks, hotels, department stores, restaurants and the like, operable up to 24 hours a day and seven days a week.

SUMMARY OF THE INVENTION

With the foregoing in mind, the invention relates to an automated check cashing apparatus comprising a customer station, an operator station, and means for enabling two-way communication between the customer station and the operator station.

The customer station includes means for dispensing currency in response to a signal from the operator station.

The operator station comprises means for receiving an image of the customer, an image of the check to be cashed and identification indicia relating to the customer. It also includes means for comparing the information received from the customer with information in a database and making a determination, based on communication with the customer and inspection of the customer's image, as to whether the check should be cashed.

DESCRIPTION OF THE DRAWINGS

The invention can best be described by referring to the accompanying drawings where a presently preferred form of the invention is described and wherein.

DETAILED DESCRIPTION OF A PREFERRED EMBODIMENT OF THE INVENTION

Figure 1:
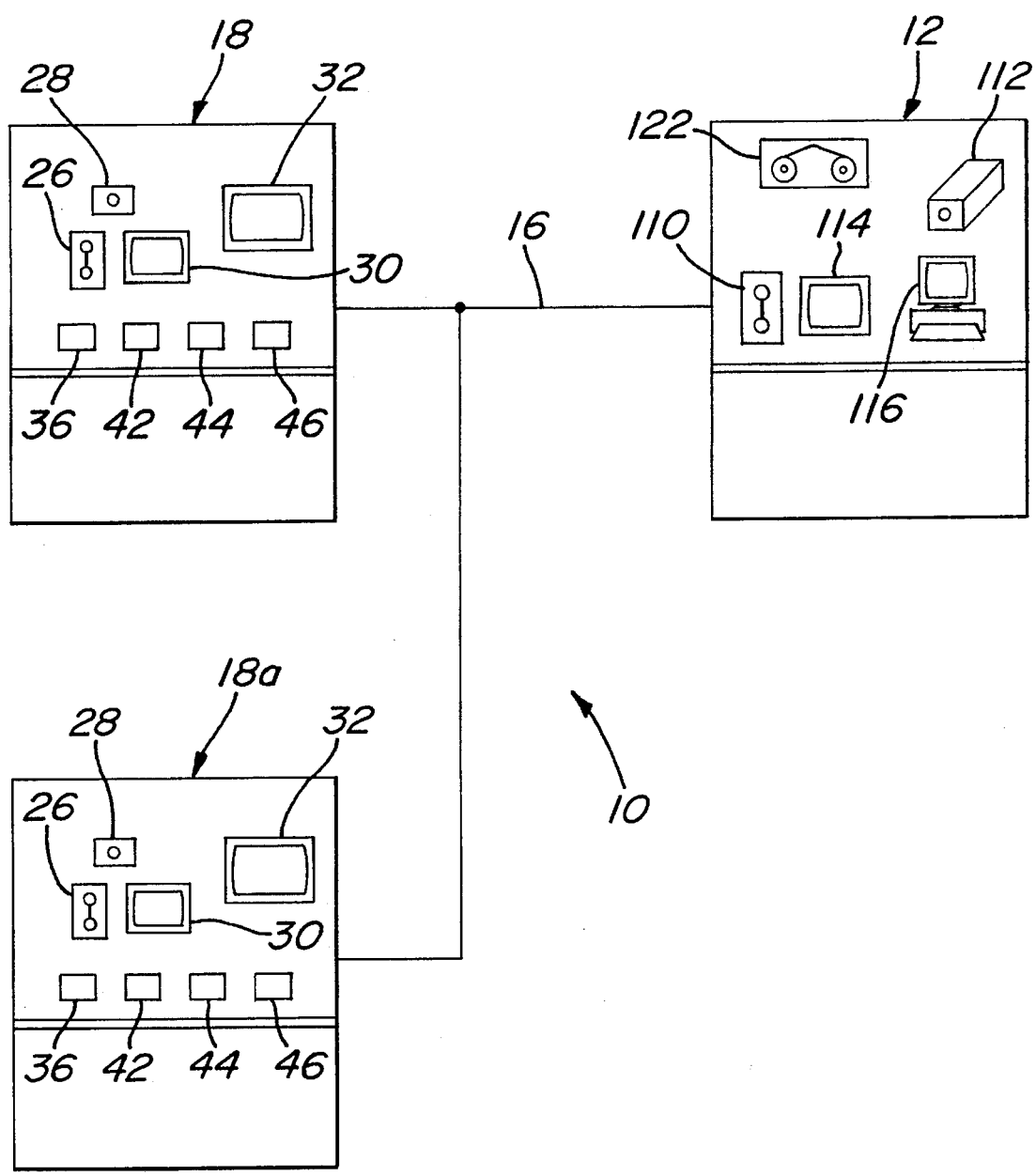
FIG. 1 is a schematic drawing showing one presently preferred form of the invention.

As best seen in FIG. 1, the check cashing system 10 comprises an operator station 12 which may be connected by suitable voice and data transmission means 16 to a plurality of customer stations 18 and 18a.

Each customer station 18, 18a is identical. Accordingly, a description of one of the customer station 18 will serve as a description for all of them.

The customer station may be in an enclosed booth in a public area or it can be an exposed machine in a supermarket, bank or the like.

Figure 2:
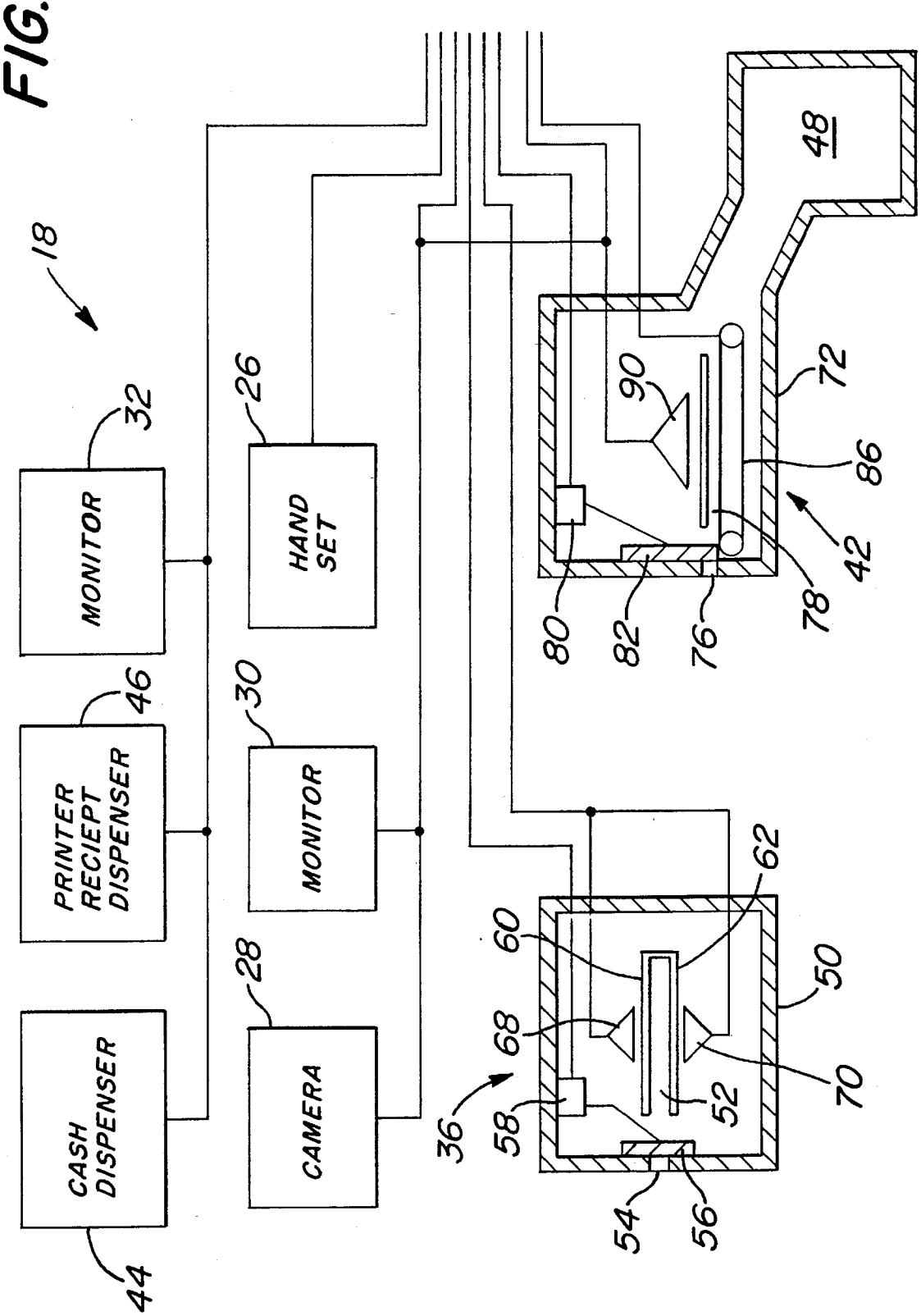
FIG. 2 is a sketch showing the components comprising a customer station constructed in accordance with a presently preferred form of the invention.

As seen in FIGS. 1 and 2, the customer station 18 includes a plurality of devices that enable communication between a person at the customer station and the operator at the operator station. The communication devices may include a handset 26, a camera 28, a video monitor 30, and a second video monitor 32. The handset 26 permits the customer and the operator to speak to each other. The camera 28 enables the operator to see the customer. The video monitor 30 permits the customer to see the operator or any message or image the operator chooses to display.

The second video monitor 32 may be used for displaying instructions to the customer as the transaction is progressing.

The customer station 18 includes a customer identification module 36, a check identification and storage module 42, a cash dispenser 44 and a printed receipt dispenser 46.

The customer identification module 36 includes means for receiving and transmitting to the operator station 12 the image of whatever identification the customer provides to obtain check approval. A suitable customer identification module 36 is made by Diebold Incorporated of Canton, Ohio.

As best seen in FIG. 2, the check identification and storage module 42 includes means for detecting the presence of indicia imprinted on a check in magnetic ink (MICR) and reading it. If it fails to detect the presence of magnetic ink, or it cannot read the MICR indicia, it returns the check to the customer. The module 42 also includes means for transmitting the MICR indicia on the check and an image of the check to the operator station 12 and to the video monitor 32, and storing the check in a vault 48 in the customer station 18 until it can be retrieved. Suitable modules 42 are made by Diebold Incorporated of Canton, Ohio and by NCR Corporation of Dayton, Ohio.

The currency dispenser 44, upon being authorized by the operator, will dispense bills and coins in sufficient amount to cash the check less any service fees that are imposed. A suitable currency dispenser 44 is made by Diebold Incorporated of Canton, Ohio or by NCR Corporation of Dayton, Ohio.

The printed receipt dispenser 46 provides the customer with a printed record of the transaction.

Referring to FIG. 2, the customer identification module 36 comprises a housing 50 that is supported in the customer station 18. The housing 50 includes a recess 52 that presents a slot 54 to the customer. The slot 54 is normally closed by door 56. The door 56 may be controlled by a suitable mechanism such as solenoid 58 so that the operator can energize the solenoid to open the door 56.

The customer identification module 36 includes transparent upper and lower surfaces 60 and 62 behind which are located cameras 68 and 70. When requested by the operator, the customer can insert a check or identification documents into the slot 54. Both the front and back of the check and the identification documents will be scanned by cameras 68 and 70 and their images transmitted to the operator station 12. The operator can then verify the identity of the customer and note the amount, payor, bank and account number of the check. A typical identification document may be a driver's license, employer's identification card or something else that includes a picture of the customer and a date of validation. While there is a wide degree of discretion on the part of the operator as to what comprises suitable identification, preferably, identification documents will comprise items that include a signature and an image of the person seeking to cash the check.

The check identification and storage module 42 comprises a housing 72 that presents itself as a slot 76 at the customer station 18. The slot 76 provides access to a recess 78 into which a check can be inserted. A solenoid 80 that is connected to door 82 is controlled by the operator to permit access to the recess 78. The recess includes a suitable conveyor 86 that brings the check under an MICR scanner 90. The scanner copies the face of the check and reads the magnetic ink character recognition symbols that are imprinted on it. This information is digitized in a well known manner within the module 42 and is transmitted to the operator station 12 (FIG. 3) where it is displayed on monitor 114. The check is also displayed on the video monitor 32 at the customer station. Thus, the customer can see that the transaction is progressing and the operator can confirm that an actual check, rather than a photocopy, has been placed in the module 42.

If the module does not detect magnetic ink, the "check" is returned to the customer. If the check is approved for cashing, the operator energizes the conveyor 86 to deliver the check to the vault 48 where it is retained until retrieved by authorized security personnel.

Figure 3:
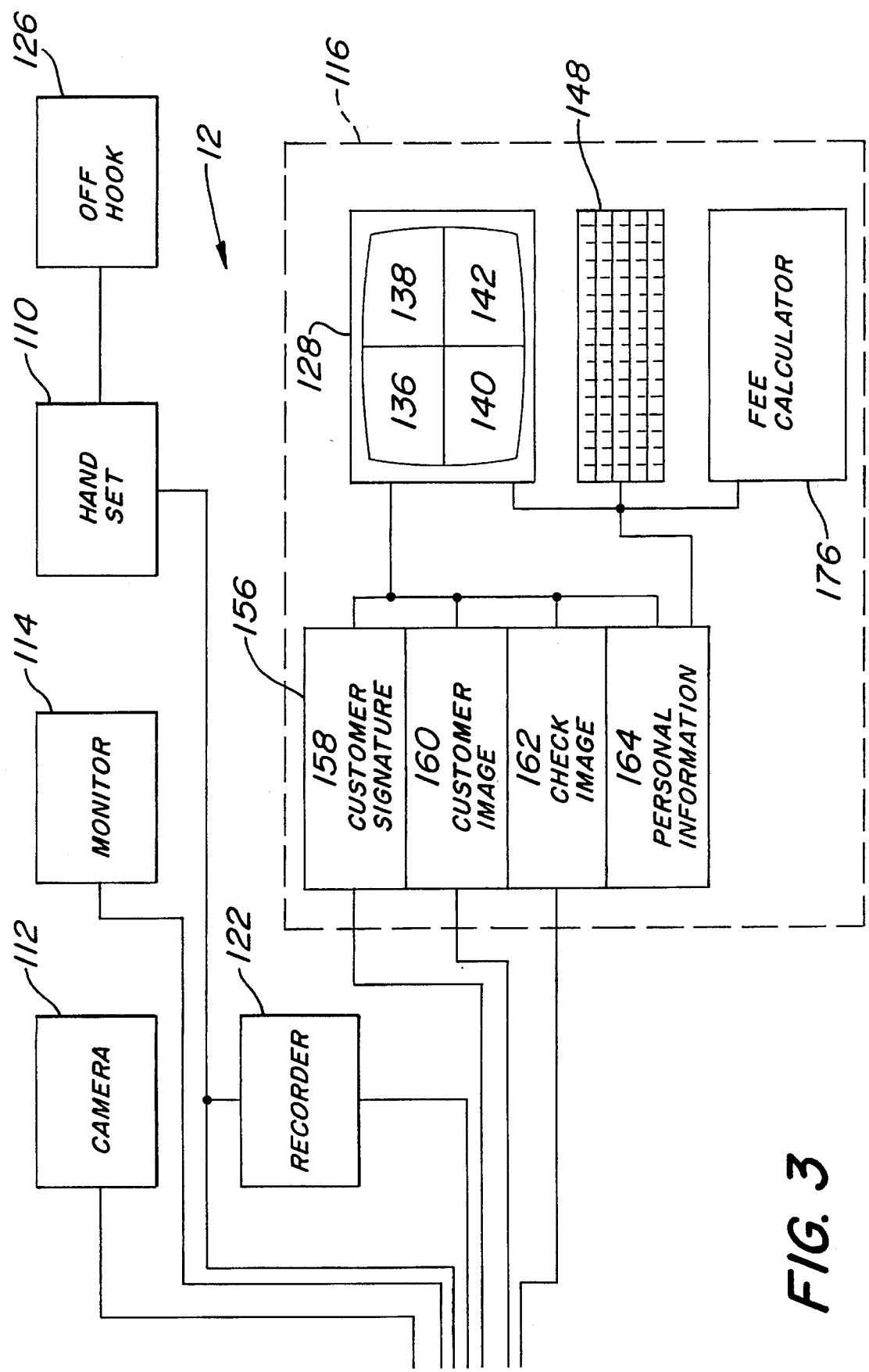
FIG. 3 is a sketch showing the components comprising an operator station constructed in accordance with a preferred form of the invention.

Referring to FIGS. 1 and 3, the operator station 12 includes devices that enable the operator to communicate with the customer at the customer station 18 and with the customer identification module 36, check identification and storage module 42, cash dispenser 44 and printed receipt dispenser 46.

The communication devices at the operator station 12 include a telephone 110, a camera 112, a video monitor 114 and a desktop computer 116 and a recorder 122. The telephone 110 includes an off-hook alarm 126 which will alert the operator to the fact that a customer at the customer station 18 has removed the telephone 26 from its receptacle and wishes to commence a transaction.

The camera 112 is connected to the video monitor 30 at the customer station 18 to enable the customer to see the operator.

Video monitor 114 displays an image of the customer as transmitted by camera 28 at the customer station.

Desktop computer 116 includes video monitor 128 that provides a display of the items inserted into the customer identification module 36 at the customer station 18. The video monitor screen may comprise as many viewing areas as the operator needs to display information that will help to identify the customer. However, for most transactions, viewing areas 136, 138, 140 and 142 will be sufficient. Viewing areas 136 and 138 are used to display both sides of the identification document. In the case of the check, the operator can see its face in one viewing area and the endorsement in another viewing area. However, if preferred, additional viewing areas can be provided in a well known manner so that additional information and images can be displayed simultaneously.

The computer 116 includes a keyboard 148 and a permanent memory 156 that may include several databases. In the presently preferred form of the invention, four such databases are provided. However, it is apparent that additional databases, up to the capacity of the permanent memory, could be provided if needed. As presently preferred, data base 158 stores images of signatures, data base 160 stores customer images, database 162 stores images of previously cashed checks, and database 164 personal information about customers such as social security numbers, employment history, birthdays, names of children, names of parents, and other personal information which is likely to be known only by the person whose name is associated with that data. The operator gains access to the databases 158, 160, 162 and 164 in a well known manner with the information so accessed being displayed in the viewing areas on video monitor 128.

In operation, the customer approaches the customer station 18 and takes the telephone handset 26 off hook. This alerts the operator at operator station 12 that a customer is at the check cashing station. The operator then energizes cameras 28 and 112 so that the operator and customer can see each other on their respective video monitors 30 and 114 as they speak to each other.

If the operator knows the customer, the transaction is short. The operator energizes solenoid 58 to open door 56 in customer identification module 36. The customer places the check in recess 52 where it is scanned by cameras 68 and 70. At the operator station, the images of the front and rear of the check appear in viewing areas 136 and 138 on monitor 128 to enable the operator to read the check and its endorsement.

The operator then energizes solenoid 80 to open door 82 in the check identification and storage module 42, and then instructs the customer to pass the check through slot 76 into recess 78. At the operator station, the image of the front of the check appears in viewing area 180 on monitor 174. The operator can then confirm that it is actually a check and not a copy of a check if the scanner reads the MICR indicia. If the MICR indicia is not present or cannot be read, the check is returned after a retry.

Since the operator can inspect the check and note the bank number and account number as well as the endorsement, it can be compared with that transmitted by the check identification and storage module 42 to confirm that the check which is placed in slot 76 is from the same bank account as that which was placed in the customer identification module 36.

The operator calculates the check cashing fee with fee calculator 176. The fee is displayed along with the net amount due the customer on video monitor 32.

If the customer approves the transaction, the operator will then energize the conveyor 86 to transfer the check to vault 48. The operator will then energize the cash dispenser 44 to dispense the net amount due the customer. Simultaneously with dispensing of the funds, the printed receipt dispenser 46 is energized to provide a printed record of the transaction for the customer.

During the entire transaction, the customer and operator are in voice communication over the telephone. This enables the operator to assist the customer in using the devices at the customer station so that the transaction is conducted in a speedy and efficient manner. Further, the entire transaction has been recorded by recorder 122.

If the operator does not know the customer, the operator can ask for identification information and compare that information with information in the databases for identification. Thus, the operator may recall from the database 160 the image of the customer to compare it with the image of the person attempting to cash the check. Further, the operator may recall from database 162 the image of other checks cashed by that customer and display them in another viewing area. This enables the operator to compare the check that the customer wants to cash with checks previously cashed by that customer. Further information such as signatures and personal information can be obtained from the other databases and displayed in other viewing areas on the monitor 128 if the operator chooses to do so.

If there is no information about the customer in any of the databases, the operator will attempt to obtain satisfactory identifying information from the customer before a decision as to whether to cash the check is made. In some instances, the operator may deem it advisable to verify the identifying information for a first time customer before cashing a check. In any event, the identifying information including the images of the customer's face and signature will be added to the databases.

The keyboard 148 is used by the operator to control the transaction. The fee calculator 176 calculates the charge that will be incurred by the customer for cashing the check and displays that information to both the operator on video monitor 128 and to the customer on video monitor 32 along with the net balance due to the customer. If the operator decides to cash the check and the customer approves the transaction, the operator sends a signal to the check identification and storage module through keyboard 148 to move the check into the vault 94 and energize the cash dispenser 44 at the customer station 18 to cash the check. If the operator decides not to cash the check, the conveyor 86 is energized to return the check to the customer and the transaction is concluded.

As explained above, the entire transaction is recorded by recorder 122 which is activated when the customer takes the telephone 24 off hook.

In addition to being able to recall data about a customer from the databases, the operator is also able to update the information in them. The personal information can be added or updated when the operator simply keys new information into the database. An image of a new customer or an updated image of that customer can be copied from the signal that is transmitted to the video monitor 114. An image of the signature of a new customer or an updated signature can be added to the database from the signals that are transmitted to the video monitor 128. In a like manner, an image of a check can also be added to the database from the signals that are transmitted to the video monitor 128.

Thus, what has been described is an automated check cashing system that can be controlled by an operator who is remote from the customer yet which features all of the safeguards and advantages that are present in check cashing agencies where the operator and customer deal with each other in face to face relationship.

While the invention has been described with respect to a particular form, it is apparent that other forms will be obvious to those skilled in the art in light of the foregoing description. Thus, the scope of the invention should not be determined by the description, but rather, only by the scope of the appended claims.

I claim:

1. An automated check cashing system for use by a customer bearing a check, said system comprising an unmanned customer station, a operator station, and means for enabling two-way communication between said customer station and said operator station, said customer station being arranged to have the customer bring the check to the customer station and including means for dispensing cash, means for transmitting the image of a customer to said operator station, means for enabling voice communication between said customer station and said operator station to enable the customer to provide verbal personal information to the operator station upon a request by the operator, means for transmitting to said operator station an image of both sides of a check that is to be cashed and a visual image of other identification documents of the customer to the operator station, and means for storing the check, said means for dispensing cash being operative in response to a signal from said operator station, said operator station being remote from the customer station and being manned with an operator, said operator station including a database means containing customer identification information and check identification information, said customer identification information comprising images of customers, signatures of customers and personal information about customers, said check identification information comprising indicia appearing on checks, means at said operator station for displaying the image of the customer, means at said operator station for displaying both sides of the check and for displaying the visual image of said other identification documents, and means at said operator station for enabling the operator to recall from the database means information stored therein for use with information provided from the customer station in order to enable the operator to determine if the check is to be cashed, and means for providing said signal to energize said cash dispenser at said customer station to dispense an amount of cash authorized by the operator at said operator station.

2. An automated check cashing system as defined in claim 1 wherein said operator station additionally comprises means for identifying the customer using the customer identification data in said database means, said means including a video monitor, and means for recalling data from said database means to said video monitor.

3. An automated check cashing system as defined in claim 1 additionally comprising means at said operator station for transmitting an image of the operator at said operator station to said customer station.

4. An automated check cashing system as defined in claim 1 additionally comprising means at said operator station for storing the displayed image of the customer in said database means.

5. An automated check cashing system as defined in claim 4 additionally comprising means for viewing said stored image of the customer and said displayed image of the customer at the same time.

6. An automated check cashing system as defined in claim 1 additionally comprising means for storing the displayed image of the customer's check in said database means.

7. An automated check cashing system as defined in claim 6 additionally comprising means for viewing a stored image of the customer's check and said an image of the check to be cashed at the same time.

8. An automated check cashing system as defined in claim 1 additionally comprising means for storing the signature of the customer in said database means.

9. An automated check cashing system as defined in claim 8 additionally comprising means for viewing a stored image of a customer's signature and said an image of the signature on the check to be cashed at the same time.

10. An automated check cashing system as defined in claim 1 additionally comprising means for loading personal information about a customer into said database means.

* * * * *